Figure 1:
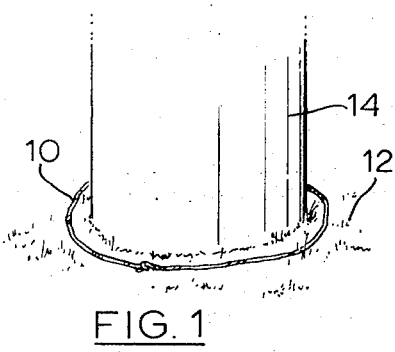

United States Patent [19]
Green

[11] 3,864,114
[45] Feb. 4, 1975

[54] SOIL TREATMENT

[76] Inventor: William Edward Green, 2561 Bloor St. W., Apt. 11, Toronto, Ontario, Canada

[22] Filed: Mar. 27, 1972

[21] Appl. No.: 238,039

[52] U.S. Cl............................... 71/3, 71/67, 71/79, 71/DIG. 1
[51] Int. Cl..................................................... A01n
[58] Field of Search........ 71/79, DIG. 1, 3; 424/362

[56] References Cited
UNITED STATES PATENTS
| | | | |
|---|---|---|---|
| 2,571,491 | 10/1951 | Schindler | 47/32 |
| 2,951,753 | 9/1960 | Groves | 71/DIG. 1 |
| 3,096,167 | 7/1963 | Farmer | 71/93 |
| 3,299,566 | 1/1967 | MacMullen | 71/DIG. 1 |
| 3,704,544 | 12/1972 | Spanel et al. | 47/9 |

FOREIGN PATENTS OR APPLICATIONS
589,926   12/1959   Canada.......................... 71/DIG. 1

Primary Examiner—James O. Thomas, Jr.
Attorney, Agent, or Firm—Weldon F. Green

[57] ABSTRACT

This invention relates to the controlled application of an active chemical to the soil through the use of a carrier or substratum in the form of an active chemical impregnated string, web, or sheet throughout the extent of which the chemicals are made available to the leaching action of rain and surface waters for migration to the soil upon which the coated carrier and active chemical is deposited.

1 Claim, 6 Drawing Figures

PATENTED FEB 4 1975　　　　　　　　　　　　　　3,864,114

SOIL TREATMENT

This invention relates to improvements in the control of the application to the soil of substances capable of altering conditions in the soil particularly to the application of herbicides, those chemical substances intended for killing plants or interrupting their normal growth, and also to the application of other chemicals capable of affecting plant growth, such as plant growth regulators and fertilizers.

Herbicides, plant growth regulators and fertilizers and like chemicals may be supplied in a relatively fine granular state, in the form of wettable powders or in solution, to be applied to a region of the soil by broadcasting granules or powders by hand, or mechanically through machinery, or by spraying them through appropriate equipment where the chemicals have been dispersed or dissolved in a liquid medium or blend.

It is difficult with known methods to limit the application of the chemical to only that quantity sufficient to produce the intended results within the region under treatment. As well it is likely there will be uneven distribution of the active chemical giving rise to undesirable and possibly harmful effects due to varying concentrations of the active chemical within the region.

Also with known methods the chemical substances are subject to drift under wind action resulting in depletion of the active chemical and also in the possible contamination of adjacent plots or acreages and consequent damage to those plants or crops growing or to be grown there.

Moreover, in the application of certain herbicides, plant growth regulators and fertilizers it may be desirable or necessary to employ the services of knowledgeable and skillful personnel to avoid dangers to the person or damage to crops.

Accordingly it is the object of this invention to provide a novel method for treating a region of the soil with active chemicals selected from the group described which includes a novel combination of carrier and the selected active chemical or chemicals, insuring substantially even distribution of the active chemical in only that quantity calculated to produce the intended results, while minimizing the risk of depletion or contamination through drift and largely eliminating the need for the services of knowledgeable and skilled personnel.

Another object of this invention is to provide a novel method for the manufacture of the combined carrier and active chemical.

It is also an object to provide an improved carrier and active chemical with which companion chemicals for influencing or controlling other conditions prevailing in the soil can be readily associated, or to which may be added synergists to enhance the activity of the principal active chemical, or chemical compounds that will preserve the product from deterioration or destruction due to the activity of bacteria, insects, rodents, birds and animals.

The principal feature of this invention resides in providing an active chemical in a dry state and in a discrete form which may be laid directly upon or in the soil only in conformity with the extent and pattern dictated by the structure of a coherent carrier selected for the chemical and there preferably anchored against displacement for exposure to the leaching action of rain or surface waters and migration with the waters to that region of the soil below and surrounding the carrier.

In the embodiment of this invention the active ingredients selected from the group described, particularly herbicides, are provided in the form of an adhered layer or surface coating on a carrier or substratum constituted by a coherent yieldable material substantially inert and adsorbent to the active chemical mixture throughout the various stages of its manufacture.

More particularly the carrier may take the form of selected fibres or filaments spun into yarn with lengths serving as the substratum for string-like or tape-like embodiments, while strands can be woven, knitted or wound into webs, sheets, or coverings having a variety of patterns, for example the texture of burlap or of a net-like configuration and which can be appropriately treated with the active chemical and cut into length or pieces to meet the requirements of a particular project and then deposited upon the soil and anchored or weighted or otherwise secured in place.

It is another feature of the invention to control the quantity of the active chemical adhered or bonded to a substratum, per unit of length or per unit of area, by providing blends in the form of dispersions or solutions of active chemcial of known strength and then contacting the selected substratum with the blends in a manner designed to insure uniform saturation throughout, followed by controlled compression where the substratum is spongy or yieldable, to expel excess fluid if necessary followed by stabilization of the combined substratum and active chemical to provide a dry product which can be stored and handled without appreciable deterioration.

Still another feature resides in providing selected adhesives for bonding the active chemical to the substratum and utilizing the characteristic of water solubility or biodegradability or other similar characteristic to control the rate of release of the active chemical to the soil whereby only the desired quantity of active chemical will escape to the soil over a predetermined time.

It is also a feature to select a biodegradable substratum for the carrier, which in the course of time will decompose and be absorbed into the soil.

Figure 2:
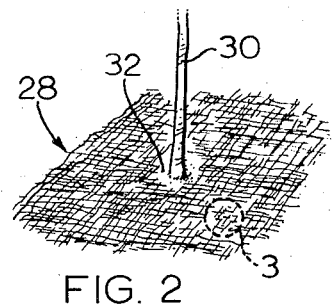
Figure 3:
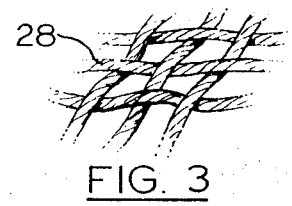
Figure 4:
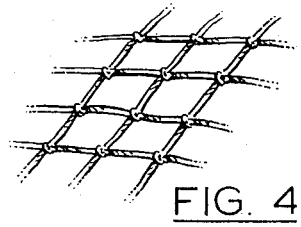

These and other objects and features will become apparent in the following description to be read in conjunction with the accompanying sheet of drawings in which in FIGS. 1, 5 and 6 pictorial perspective views, partly broken away, illustrate typical applications of the novel combination of carrier and active chemical in soil treatment;

FIGS. 2, 3 and 4 are a perspective plan view, partly broken away, illustrating a special use of the novel combination of woven carrier and active chemical; FIG. 3 is an enlarged view of a section of the combined carrier and active chemical marked 3 in FIG. 2, whereas FIG. 4 is a perspective view partly broken away illustrating the structure of an alternative net-like carrier.

It may be desirable, in some cases necessary, to control the growth of weeds, bushes, grasses and other vegetation along fence lines. This project requires substantial physical effort if the growth is only trimmed or cut back, costly if herbicidal chemicals are used and hazardous if crops, grasses or foliage are nearby and could be affected by migration of the chemicals or by drift.

Other growth areas in which control is needed or desired are those strips of soil next adjacent to the foundation of buildings, those areas surrounding posts and towers carrying electrical lines and cables, the narrow sections of soil between flag stones in walks and patios or the dividing strips for highways and the adjacent strips of land bordering highways, to name but a few.

According to one embodiment of this invention an herbicide for controlling or killing unwanted growth can be deposited in the specified region as a dry coating on a string-like length of a suitable substratum or carrier. If the string is anchored in position then the herbicide can escape to the soil through the leaching action and migration of rain waters or surface waters substantially only throughout that area defined by the length of the string and the limits imposed upon the migration of waters contacting the active chemical flowing over the carrier and percolating into the supporting and surrounding soil.

Figure 5:
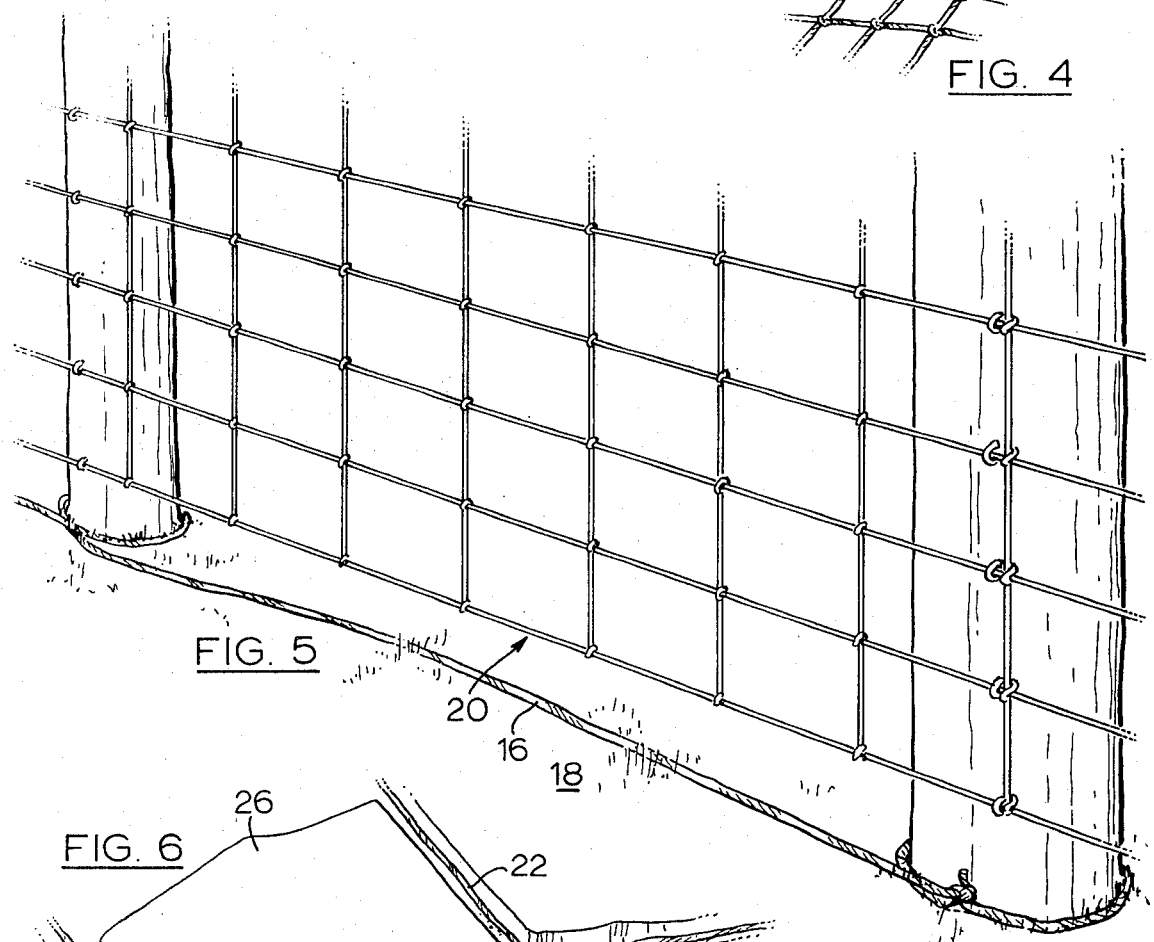
Figure 6:
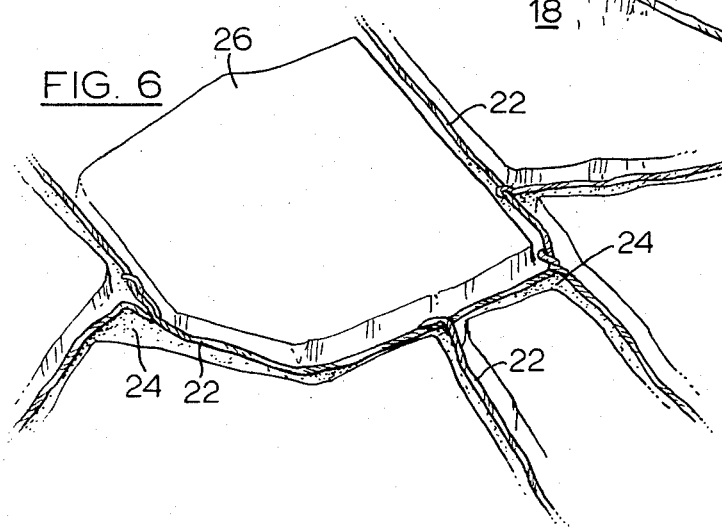

FIGS. 1, 5 and 6 of the drawings illustrate three circumstances where an herbicide delivered as a coating on a string to a specified region for treatment can be far more easily and efficiently accomplished than with known methods of application.

In FIG. 1 a piece of string 10 located with an herbicide is shown deposited on the soil 12 surrounding the base of a post 14. With the ends of the piece tied together the string is secured such that the herbicide can be released to the soil only within that region immediately surrounding the post to control or kill the growth.

In FIG. 5 a longer piece of string 16 suitably coated with an herbicide is shown deposited upon the strip of soil 18 at the base of a fence 20. By tying each end of the string 16 to the fence the string is secured and the herbicide will be released to the soil only within that region immediately below and along its length.

In FIG. 6 several pieces of string 22 coated with an appropriate herbicide are shown deposited in the soil strips 24 between flag stones 26 of walk or patio. The pieces can be held in place by covering them over with a layer of soil or by small stakes or stones.

By providing only that amount of active chemical per unit of length necessary to control or kill growth for a season and by incorporating in the coating a release agent such as a degradable adhesive substance to retard the leaching action not only is possible to avoid applying excess herbicidal chemicals but only one application is required each season.

It is also contemplated that one application of herbicidal string will be sufficient for more than one season through the use of selected release agents relatively insoluble in water or biodegradable to retard the leaching action to an even greater degree.

FIG. 2 is intended to illustrate a special application of still another embodiment of the invention.

Reforestation is now recognized as essential to preserve the character and quality of soils. Often in burnt out areas or in regions in which the trees have been harvested there is substantial ground cover of weeds and bushes which by their nature compete for survival.

In accordance with this invention a woven carrier or web 28 derived from strands of suitable substratum have been coated with a selective herbicide or herbicidal mixture designed to destroy certain weeds and grasses, but leaving particular tree seedlings unaffected.

By depositing and anchoring web 28 on the ground in the area to be reforested and transplanting a seedling 30 to a position within central opening 32 of web 28 the transplanted seedling 30 will be given ample space within which to root and grow without competition from surrounding vegetation for a time and thereby be more likely to survive.

Accordingly, reforestration of an afflicted area using this embodiment will promote survival of transplanted seedlings in much greater numbers.

In this example it will be obvious in addition to the selective herbicide or mixtures of them, plant nutrients or plant growth regulators can be adhered to the surfaces of the web 28 and released to the soil through the leaching action and migration of waters to give still further impetus to the seedling growth.

Likely, it will be desirable to include together with the active chemicals additives such as fungicides, nemotocides, insecticides, rodenticides and animal repellants, to preserve the placement and character of the deposited web and active chemical for the time needed to root the seedling.

In other surroundings an algaecide or bactericide may be required to sustain the placement and character of the web.

In special circumstances synergists to enhance the activity of the chemicals may be readily included in the chemical mixture.

In accordance with the invention it will be readily understood that instead of coating the substratum with an herbicide as the principal active chemical a plant growth regulator or a fertilizer can be selected as the principal chemical.

For example a piece of substratum coated with a selected plant growth regulator or a selected fertilizer can be deposited upon the soil around the base of a bush in a manner similar to that illustrated in FIG. 1, to supply sufficient active chemical to the plant for the season or for part of a season depending upon the concentration per unit of length of the active chemical and release agents controlling the leaching action.

A longer piece of substratum suitably coated with a nutrient can be deposited on the soil in a manner similar to that illustrated in FIG. 3 along a row of shrubs or along a row of flowers or vegetables in a garden and anchored in place.

If a variety of plant nutrient treatments were desired for a mixed garden then lengths of substratum coated with the various selected nutrients can be laid out row by row and anchored in place to meet the differing requirements of neighbouring plant growth.

Where large sections of the soil are to be treated, woven carriers such as that illustrated in FIG. 2 and 3, or net-like carriers such as that illustrated in FIG. 4, or a variety of other patterns suitably impregnated or coated with the selected herbicide, plant growth regulator or fertilizer and additives can be laid out upon the soil or cut into pieces and deposited and anchored over those regions selected for treatment, and there deliver under the leaching action and migration of waters, in place, only that quantity of special chemical contained in the surface coating, controlled if desired by suitable release agents.

According to this invention one material useful as a carrier or substratum is regenerated cellulose.

Regenerated cellulose is available in the form of sheets or strips or in the form of fibres or filaments and has been found to be substantially inert to the active chemicals under consideration. Moreover, the fibrous cellulosic mass is biodegradable.

The fibres or filaments can be spun into a yarn, and from yard woven into sheets having the character of burlap or a net-like configuration or wound into any other design depending upon the pattern of application of active chemical desired.

Regenerated cellulose in the form of fibres or filaments is coherent, spongy or yieldable and has been found adsorbent in relation to blends of the active chemicals or combinations thereof.

One example of a blend of materials for a coating, including active herbicidal chemicals, designed to selectively control the growth of weeds and grasses, but not interfere materially with the growth of certain herbacious plants and woody plants such as those found or cultivated in nursery or tree plantations is as follows:

| (a) | simazine (80% W.P.) | 2.5 % |
|---|---|---|
| (b) | atrazine (80% W.P.) | 2.5 % |
| (c) | polyvinyl alcohol | 3.0 % |
| (d) | dye, anti-foaming agent, wetting agent, a trace | 1.0 % |
| (e) | water | 91.0 % |
| | | 100.0 % |

In the aforementioned blend the simazine and atrazine are the dispersed phase in the water-polyvinyl alcohol system.

The polyvinyl alcohol serves as an adhesive to bond or adhere the discrete herbicidal chemicals to the surface of a carrier and to control the release of those chemicals.

The antifoaming and wetting agents produce a wettable dispersion and solvent mixture in accordance with known procedures with the dye serving as an indicator for the active chemical.

According to the invention a length of substratum in the form of a string or web of fibrous cellulosic yarn can be dipped, passed through or sprayed with the blend at ambient temperatures. The degree of saturation of the carrier is controlled by the adsorbent character of the carrier, the length of time in contact with the blend and by the concentration of active chemicals.

The spongy fibrous cellulosic mass can be squeezed or compressed following contact with the blend to expel excess quantities, if necessary, whereupon the mass can be dried in any suitable manner to preserve the character and activity of the mass at ambient temperatures and to provide a dry stable product which can be stored or handled without appreciable deterioration.

The preferred adhesive, polyvinyl alcohol, is water soluble and upon drying provides in place adhesion of the active ingredients. When deposited upon the soil the polyvinyl alcohol adhesive controls the rate of leaching out of the active chemical in accordance with its own water solubility factor.

The active chemicals per unit of length or area can be determined by well known analytical procedures and the steps of the process modified to produce the desired quantities per unit having regard to the area of soil intended to be treated through the leaching action, migration and percolation of rain and surface waters and the length of time over which such chemicals are to be delivered through the selection of suitable release agents.

The following is a typical herbicidal composition or blend to be used with woven fabrics as the substratum or carrier.

| (a) | fenuron | (80% W.P.) | 5 to 25 % |
|---|---|---|---|
| (b) | simazine | (80% W.P.) | 4 to 5 % |
| (c) | thiram | | 2 to 20 % |
| (d) | dye, antifoaming agent, wetting agent | | a trace element |
| (e) | water | balance to | 100 % |

Fenuron is a weed and brush killer, whereas simazine is used to control grasses and broadleaf weeds.

In contrast with those compositions or blends in which the herbicide is essentially in the form of a dispersed phase herbicides soluble in water or in other solvents may also be used in accordance with this invention.

One such example is 2-4 D amine, the amine salt of 2-4 dichlorophenoxyacetic acid, which is soluble in water. Other water soluble herbicides are 2-2 dichloropropionic acid (sodium salt) and amitrole (3 amino- 1, 2, 4, triazole salts).

The application of ther chemicals in accordance with this invention will be obvious to those skilled in this field.

Water soluble modified cellulosics suitable for incorporation in herbicidal compositions or blends are carboxy methyl cellulose and derivatives thereof, hydroxy ethyl cellulose and derivatives thereof, and hydroxy propyl cellulose and derivaties thereof.

In contrast fertilizers, preparations or mixtures designed to enrich the soil in plant food can be delivered in substantial quantities, such as amonia salts, super phosphates, potassium salts and other nutrients such as calcium, magnesium, sulphur and micronutrients any of which may be incorporated as a component of a herbicidal composition or blend or constitute the principal active chemical where plant feeding is paramount to which a plant growth regulator may be added.

It will be understood that persons skilled in this field will be able to formulate compositions or blends of herbicides, plant growth regulators, fertilizers and micronutrients together with adhesives and repellants or synergists selected to supply the desired quantity of active chemical to a specified region of the soil in precisely controlled amounts and to maintain such control while in place as is needed.

While only the preferred embodiments of the invention have been described and illustrated obviously modifications, variations or substitutions may be undertaken by those skilled in the art without departing from the spirit and scope of the invention as defined in the appended claims.

The embodiments of the invention in which an exclusive property or privilege are claimed are defined as follows:

1. In a method for manufacturing a composite article of the type employed for the controlled application of an active chemical to the soil through use of a carrier of an active chemical impregnated string, the improvement comprising the steps of selecting a length of compressible adsorbent yarn derived from spun filaments of regenerated cellulose, an active chemical composition including at least one of a herbicide, plant growth regulator or plant nutrient suitable for use in the treatment of the soil and a degradable adhesive substantially inert to the activity of said chemical composition and to said yarn; then combining said active chemical composition and said degradable adhesive into a blend of substantially uniform consistency; then contacting said yarn with said blend in a manner whereby said yarn is substantially saturated with said blend; then compressing said saturated yarn to expel excess blend and to substantially uniformly distribute said blend throughout the extent of said yarn; and then subjecting said compressed yarn and blend to conditions of controlled temperature to dry the same without decomposition.

* * * * *